(12) United States Patent
Novak et al.

(10) Patent No.: US 8,929,196 B2
(45) Date of Patent: Jan. 6, 2015

(54) SYSTEM AND METHOD FOR DYNAMIC BAND SCHEDULING

(75) Inventors: Robert Novak, Stittsville (CA); David G. Steer, Nepean (CA)

(73) Assignee: BlackBerry Limited, Waterloo (CA)

( * ) Notice: Subject to any disclaimer, the term of this patent is extended or adjusted under 35 U.S.C. 154(b) by 140 days.

(21) Appl. No.: 13/639,418

(22) PCT Filed: May 10, 2010

(86) PCT No.: PCT/CA2010/000692
§ 371 (c)(1),
(2), (4) Date: Oct. 4, 2012

(87) PCT Pub. No.: WO2011/140624
PCT Pub. Date: Nov. 17, 2011

(65) Prior Publication Data
US 2013/0028128 A1    Jan. 31, 2013

(51) Int. Cl.
| H04J 11/00 | (2006.01) |
| H04W 52/02 | (2009.01) |
| H04L 1/00 | (2006.01) |
| H04B 17/00 | (2006.01) |
| H04W 88/10 | (2009.01) |
| H04W 88/06 | (2009.01) |
| H04W 72/02 | (2009.01) |
| H04W 72/04 | (2009.01) |

(52) U.S. Cl.
CPC ........... *H04B 17/0077* (2013.01); *H04W 88/10* (2013.01); *H04W 88/06* (2013.01); *H04W 52/0219* (2013.01); *H04L 1/00* (2013.01); *H04W 72/02* (2013.01); *H04W 72/0413* (2013.01); *H04W 72/0453* (2013.01); *H04W 52/0216* (2013.01)

USPC ........... 370/208; 370/210; 370/252; 370/338; 370/328

(58) Field of Classification Search
None
See application file for complete search history.

(56) References Cited

U.S. PATENT DOCUMENTS

| 5,134,709 | A | 7/1992 | Bi et al. | |
| 5,787,346 | A | 7/1998 | Iseyama | |
| 8,451,784 | B2 * | 5/2013 | Ness et al. | 370/329 |
| 8,477,642 | B2 * | 7/2013 | Nagaraja | 370/252 |
| 2003/0064729 | A1 * | 4/2003 | Yamashita | 455/451 |
| 2005/0272432 | A1 | 12/2005 | Ji et al. | |
| 2007/0177545 | A1 | 8/2007 | Natarajan et al. | |
| 2009/0196180 | A1 * | 8/2009 | Bahl et al. | 370/235 |
| 2010/0316004 | A1 * | 12/2010 | Macias et al. | 370/329 |
| 2012/0243638 | A1 * | 9/2012 | Maltsev et al. | 375/316 |

FOREIGN PATENT DOCUMENTS

| EP | 1677563 | 5/2006 |
| EP | 2034759 | 3/2008 |
| WO | 2011140624 | 11/2011 |

OTHER PUBLICATIONS

EPO, Communication Pursuant to Rules 161(2) and 162 EPC, Application No. 10851172.6, Dec. 18, 2012, 2 pgs.
EPO, Communication of European Publication, Application No. 10851172.6, Feb. 20, 2013, 1 pg.

(Continued)

*Primary Examiner* — Duc C Ho
(74) *Attorney, Agent, or Firm* — The Danamraj Law Group, P.C.

(57) ABSTRACT

A method and apparatus that allows a communication system to operate across multiple bands and access technologies and to dynamically assign bands to user equipment (UE) devices based on properties of the bands, traffic conditions, services being delivered and other considerations.

23 Claims, 6 Drawing Sheets

(56) References Cited

OTHER PUBLICATIONS

PCT, Search Report, Application No. PCT/CA2010/000692, Jan. 19, 2011, 4 pgs.

PCT, Written Opinion, Application No. PCT/CA2010/000692, Jan. 19, 2011, 5 pgs.

TW IPO, Office Action, Application No. 100116374, Oct. 28, 2013, 4 pgs.

* cited by examiner

SYSTEM AND METHOD FOR DYNAMIC BAND SCHEDULING

This application is a national stage entry of PCT/CA2010/000692, filed May 10, 2010.

TECHNICAL FIELD

The present disclosure relates, in general, to radio communication systems and, in particular, to a system and method for dynamically scheduling devices on available bands.

BACKGROUND

A mobile communication system uses radio resources for transmission. In existing systems, the radio resources are generally located within one local area of the frequency spectrum, which is hereafter called a "band". For example, a cellular mobile radio system may use radio resources in a band around 850 MHz. In some examples, the band may include separated segments, some used for transmission (i.e. network to mobile user equipment (UE) device communication) and another for reception (i.e. UE device to network communication). This is commonly referred to as Frequency Division Duplexing (FDD). Some radio communication systems, however, use the same band resources for transmission and reception, although separated in time. This is commonly referred to as Time Division Duplexing (TDD). As communication device usage has proliferated, a number of different bands have been assigned for services, often using different technologies. The modern communication systems have thus become spread across multiple bands that are sometimes widely separated in frequency and with widely varying communication properties.

BRIEF DESCRIPTION OF THE PREFERRED EMBODIMENTS

For a more complete understanding of the features and advantages of the present methods, radio access networks and mobile user equipment (UE) devices, reference is now made to the detailed description along with the accompanying figures in which corresponding numerals in the different figures refer to corresponding parts and in which.

DETAILED DESCRIPTION OF THE DRAWINGS

The assignment of a specific band to a service or geographic region has been largely a matter of regulatory convenience and historical commercial arrangements. However, because of the differing frequencies, the different radio bands typically have different properties, e.g. fading, scattering, occupancy and cost. Additionally, user equipment (UE) devices may have different constraints that may be due to their method of use and the use of other UE devices in the region. These constraints may include, e.g., sensitivity to delay, errors and Doppler frequency shift. In the current radio communication systems, mobile user equipment (UE) devices having specific service constraints are often not optimally assigned to bands with suitable properties. By optimally assigning UE devices to appropriate bands, a network may achieve an improvement in service and more efficient use of the spectrum. From the standpoint of the UE device, optimal assignment to a band can improve customer satisfaction with regard to aspects such as quality of service, cost and battery life.

Disclosed herein is a radio access network that uses available radio resources from multiple bands and dynamically or semi-statically assigns these radio resources according to the constraints and conditions of the mobile UE device and the properties of the available bands, which may be separated significantly in frequency. The disclosed embodiments of the radio access network exploit the differences in the properties of the different radio bands, assigning each UE device to an appropriate band or bands by making a best match of the properties of the available bands to the needs and constraints of the UE devices utilizing the bands.

Figure 1:
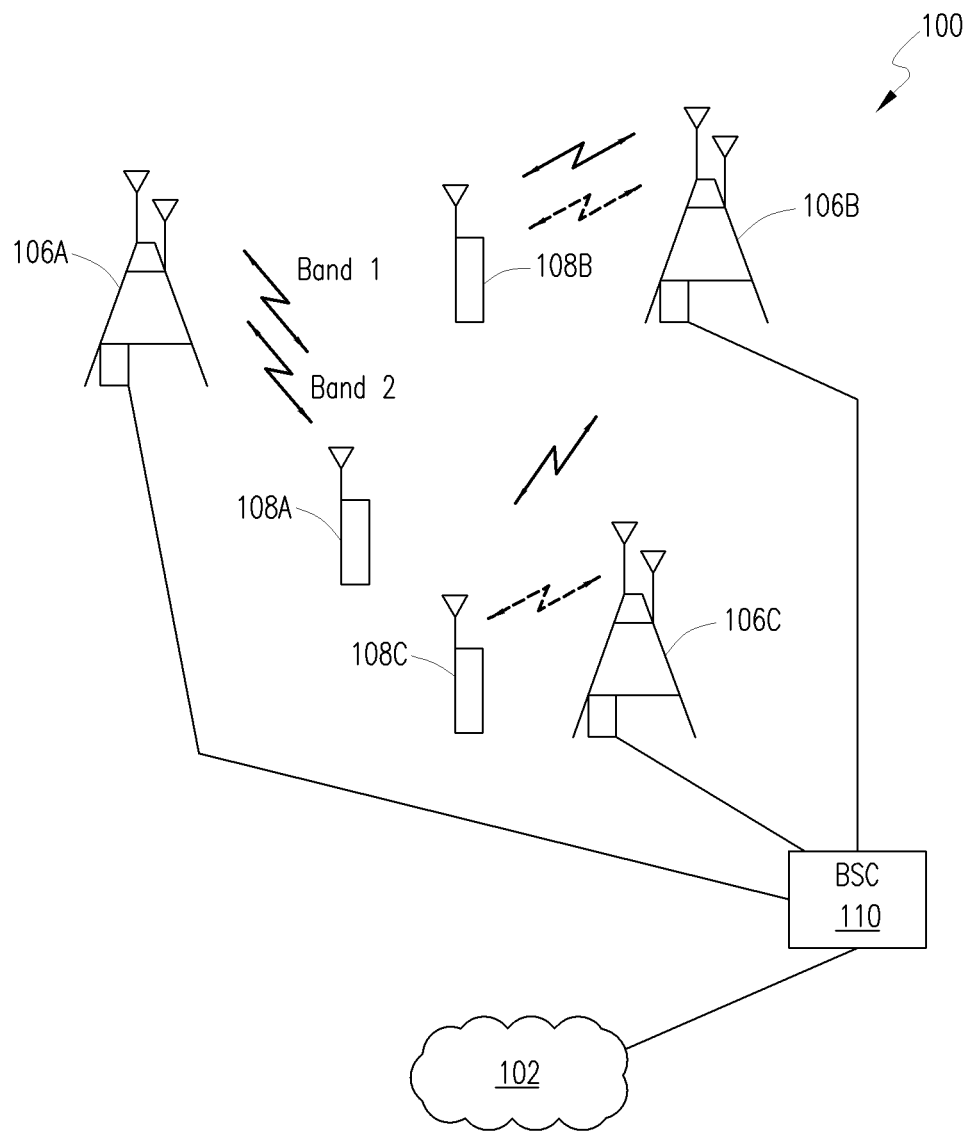
FIG. 1 is a system diagram depicting a radio access network according to an embodiment of the disclosure.

Referring now to the drawings, and more particularly to FIG. 1, depicted therein is an exemplary generalized radio access network (RAN) 100 of core communication network 102 wherein one or more embodiments of the present patent disclosure may be practiced to assign bandwidth on appropriate bands to wireless UE devices 108 on radio access network 100. Communication network 102 may comprise one or more core networks providing one or both of voice and data communication. Communication network 102 may further include connections to the Public Switched Telephone Network (PSTN), to various service providers such as the Internet and to other communication networks (none of which are specifically shown). RAN 100 includes a number of base stations 106 that communicate with UE devices 108 using multiple bands that are dynamically assigned. Base stations 106 can be connected to each other in order to perform handoff of UE devices as the UE devices move from one region to another. These connections may be direct links or via base station controller (BSC) 110 that controls multiple base stations. Each of base stations 106 are equipped with radio apparatus that enables communication with UE devices 108 using multiple radio frequency bands and radio waveforms that may include different radio access technologies (RATs). As illustrated in this embodiment, base stations 106 are each shown with two antennas, indicating that the base station can operate on two separate bands at the same time, although this is intended to be illustrative rather than limiting, as a base station can be configured to control operations on many bands simultaneously.

In one embodiment, radio access network 100 is an aggregation of channels from multiple bands in the radio access technology LTE-A (Long Term Evolution-Advanced). LTE-A is a set of enhancements to the Universal Mobile Telecommunication System (UMTS) that includes an all-IP networking architecture and the ability of each base station 106 to connect to multiple core networks (CNs). The aggregation of bands may include channels from multiple carriers and assignment of bands may be managed at either the base station or base station controller. In an LTE-A embodiment, the same radio access technology may be used across the aggregated channels, e.g., orthogonal frequency-division multiplexing (OFDM) on the downlink from base station to UE device and Single Carrier Frequency Division Multiple Access (SC-FDMA) for the uplink from UE device to base station. In frequency division multiplexing (FDM), multiple signals are transmitted simultaneously over a single transmission path, such as a cable or wireless system. Each signal travels within its own unique frequency range or carrier, which is modulated by the data, such as text, voice, video, etc. OFDM techniques distribute the data over a number of sub-carriers that are "orthogonal" to each other, i.e., the dot product of their deterministic signals is equal to zero. The sub-carriers are spaced apart at precise frequencies, but do not require "guard" bands between the sub-carrier frequencies, as is often necessary in FDM systems. In a typical terrestrial broadcasting scenario there are multi-path-channels in which the transmitted signal arrives at the receiver using various paths of different length due to reflections off of various objects. Since multiple versions of the signal interfere with each other, it becomes very hard to extract the original information; OFDM may provide lower multi-path distortion.

In an alternate embodiment, RAN 100 is an aggregation of channels from different bands that utilize different radio access technologies such as UMTS and WLAN. However, unlike current systems in which each base station utilizes a single radio access technology, base stations 106 may assign resources on multiple bands, which may use different RATs. As in the previous example, assignment may also be managed at the base station or base station controller. In an alternate embodiment, base station controller 110 is connected to base stations 106 of several different technologies and can control the assignment of any of the aggregated bands to a UE device when appropriate. For purposes of the present patent application, RAN 100 may be implemented in any combination of known or heretofore unknown radio access technology and network protocol. For instance, RAN 100 may comprise a combination of UMTS Terrestrial Radio Access Network (UTRAN), Wireless Local Area Network (WLAN), Digital Enhanced Cordless Technology (DECT), GSM EDGE Radio Access Network (GERAN), Worldwide Interoperability for Microwave Access (WiMAX) network, etc. As will be seen herein below, the embodiments of the present patent application for assigning appropriate radio bands to UE devices will be described regardless of any particular wireless network implementation.

In at least some embodiments, RAN 100 can adapt its transmission/reception techniques, i.e. modulation type, coding rate, signaling rate and power, to suit the selected band. In some cases additional RAT properties (for example, sub-carrier spacing or variable RAT properties), or the RAT itself, may be changed due to properties of the band, or constraints and conditions of the UE device or its traffic. The network can adapt the RAT to the band, to the needs of the UE device or to some combination of the properties of the band and the constraints and conditions of the UE devices in order to improve the mapping of band properties and UE device conditions and constraints. For example, the sub-carrier spacing could change for higher speed mobiles or bands with higher frequency shift due to Doppler shift. In this example, the RAT may use larger sub-carrier spacing for the channels subject to high Doppler shift and for those mobile services involving high-speed mobiles incurring higher Doppler shift of their transmission frequencies. For example, in a system using OFDM, the RAT may adapt its sub-carrier spacing by using every second sub-carrier in order to increase the sub-carrier spacing for applications to accommodate higher Doppler shift.

Other combinations of sub-carriers that are omitted or inserted from the standard RAT format may also be used to adapt the OFDM to accommodate various Doppler shifts. This may include, for example, non-uniform cases in which sub-carriers used as system pilot signals are retained in order to be able to continue to use standard decoders. However, adjacent sub-carriers used for traffic may be omitted in order to prevent interference due to Doppler shift in these traffic-carrying sub-carriers. By not affecting the pilot signal or sub-carrier locations, UE devices that are unaware of this modification but require the pilot channel will not be affected. For example, in LTE Release 8 systems, a pilot channel is used common to all mobiles, called common reference signals, or CRS. In some implementations, modifications that change the sub-carrier spacing or that omit or insert sub-carriers would not affect CRS locations so that legacy LTE Release 8 UE devices could still use these for demodulation. In addition, the omission of sub-carriers may be non-uniform as different channels may have different sensitivities to Doppler shift. For example, a specific control channel may be more sensitive to Doppler shift than a specific data channel, and therefore more sub-carriers may be omitted for the data channels.

Continuing to refer to FIG. 1, UE devices 108 are also equipped with radio apparatus for operation on multiple bands and in multiple technologies. In some embodiments of UE device 108, the UE device contains a single antenna. Although the UE device is configured to operate on a number of bands, communication is limited to a single band at one time. In this embodiment, the UE device may be operable to perform time-sharing between two different technologies in order to operate on different bands in a manner that appears simultaneous to the user. In another embodiment, UE device 108 contains two antennae and can support concurrent operation on the two antennae operating in different bands. As illustrated in FIG. 1, UE devices 108A, 108B, 108C are each in communication with one or more of base stations 106A, 106B, 106C using multiple radio bands. UE device 108A is shown as communicating on two separate bands with base station 106A, e.g., a first band for control signals and a second band for voice communication. UE device 108B is also shown as communicating with base station 106B on two separate bands, e.g., a voice channel and a data channel. UE device 108C is illustrated as communicating with base station 106B using a first band, e.g. for voice communication and with base station 106C using a second band, e.g. for data communication.

Figure 2:
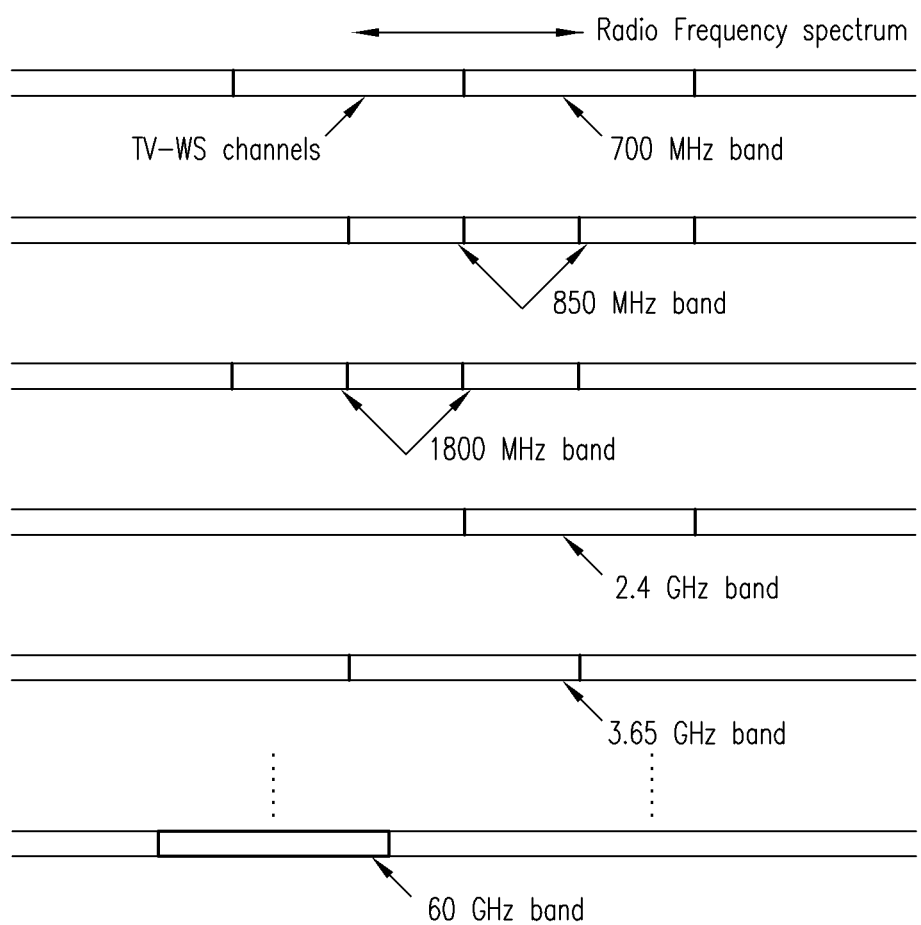
FIG. 2 depicts a number of bands on which a radio access network can operate according to an embodiment of the disclosure.

FIG. 2 illustrates some of the multiple bands that may be used in RAN 100 according to an embodiment. Shown by way of example are the 700, 850 and 1800 MHz mobile communication bands, the 2.4 GHz WLAN band, the interleaved communication channels of the TV bands (so-called TV white space or TV-WS), the 3.65 GHz band and the 60 GHz band. The disclosed bands, as well as other bands not specifically mentioned, vary widely in frequency and have different characteristics, which may include both inherent physical properties and assigned properties, such as those properties determined by regulatory organizations or the operator of a network. Not all different bands will have all of these differences in properties, but disclosed embodiments can exploit or avoid the subsets that may occur in practical conditions. The properties associated with the bands include the following:

Rate of channel change, i.e., short term fading characteristics;
Scattering;
Frequency selectivity, e.g., frequency selective fading within a band;
Propagation/penetration losses;
Doppler shift, i.e., the shift in frequency due to the motion of the UE device, either away from or towards the base station;
Atmospheric or environmental absorption, e.g., related to the transmission medium;
Propagation characteristics, e.g. range, reflectivity off objects, ground, clouds, etc;
Long-term fading characteristics;
Losses and performance of transmission and reception equipment;
Interference conditions either natural or artificial;
Differences in regulation;
Differences in radio access technology (RAT) applied;
Ability to change or adapt RAT in band;
Differences in RAT configuration or features supported, e.g., TDD, FDD, etc.;
Cost, which may include one or more of cost of the radio access network, the service provider, backhaul, etc;
Differences in factors that impact delay, e.g., errors requiring re-transmissions, coding, traffic loading; and
Bandwidth.

In addition to the properties associated with the different bands, the constraints and conditions of the UE devices and associated traffic are also taken into consideration in assigning bandwidth on a band to one or more UE devices. For convenience, the constraints and conditions of the UE device (s) and of the traffic associated therewith are referred to in the rest of the present application as the properties associated with the UE device(s) or the properties associated with the traffic, with either term covering the properties of individual UE devices and the accumulated traffic. For example, the properties associated with the UE devices that may influence scheduling in different bands include:

Type of service requested, e.g. voice or data communication;
Speed of motion of a UE device;
Location of the UE device;
Proximity to the transmitter, i.e., the base station;
Band quality;
Terminal capability (e.g. number of antenna for MIMO, RAT, RAT configurations, data rate, etc);
UE device cost structure (for RATs, bands, services, subscriptions etc.);
Sensitivity of traffic to delay;
Traffic volume, on either the access network or nearby networks; and
Interference due to the traffic.

Figure 3A:
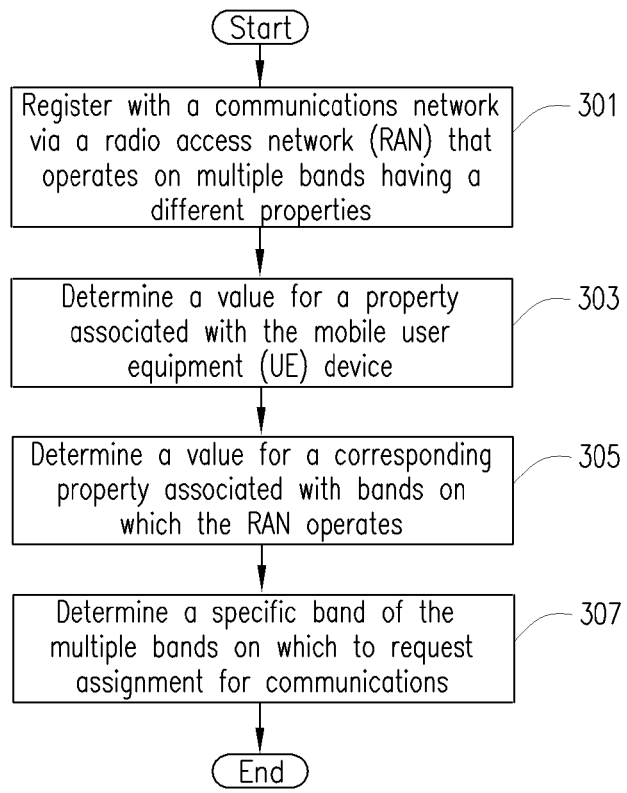
FIG. 3A is a diagram depicting a method operable at a UE device for requesting assignment to a band according to an embodiment of the disclosure.
Figure 3B:
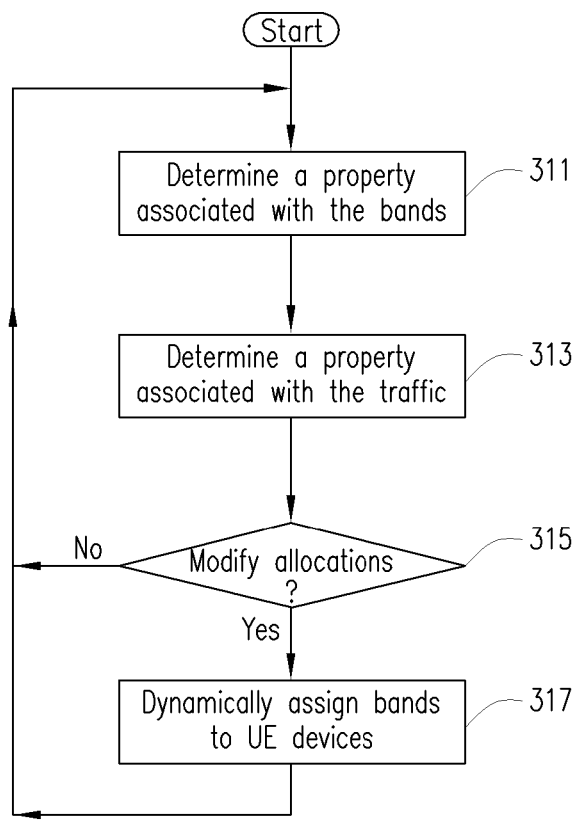
FIG. 3B is a diagram depicting a method operable at a network node for assigning UE devices to specific bands according to an embodiment of the disclosure.
Figure 3C:
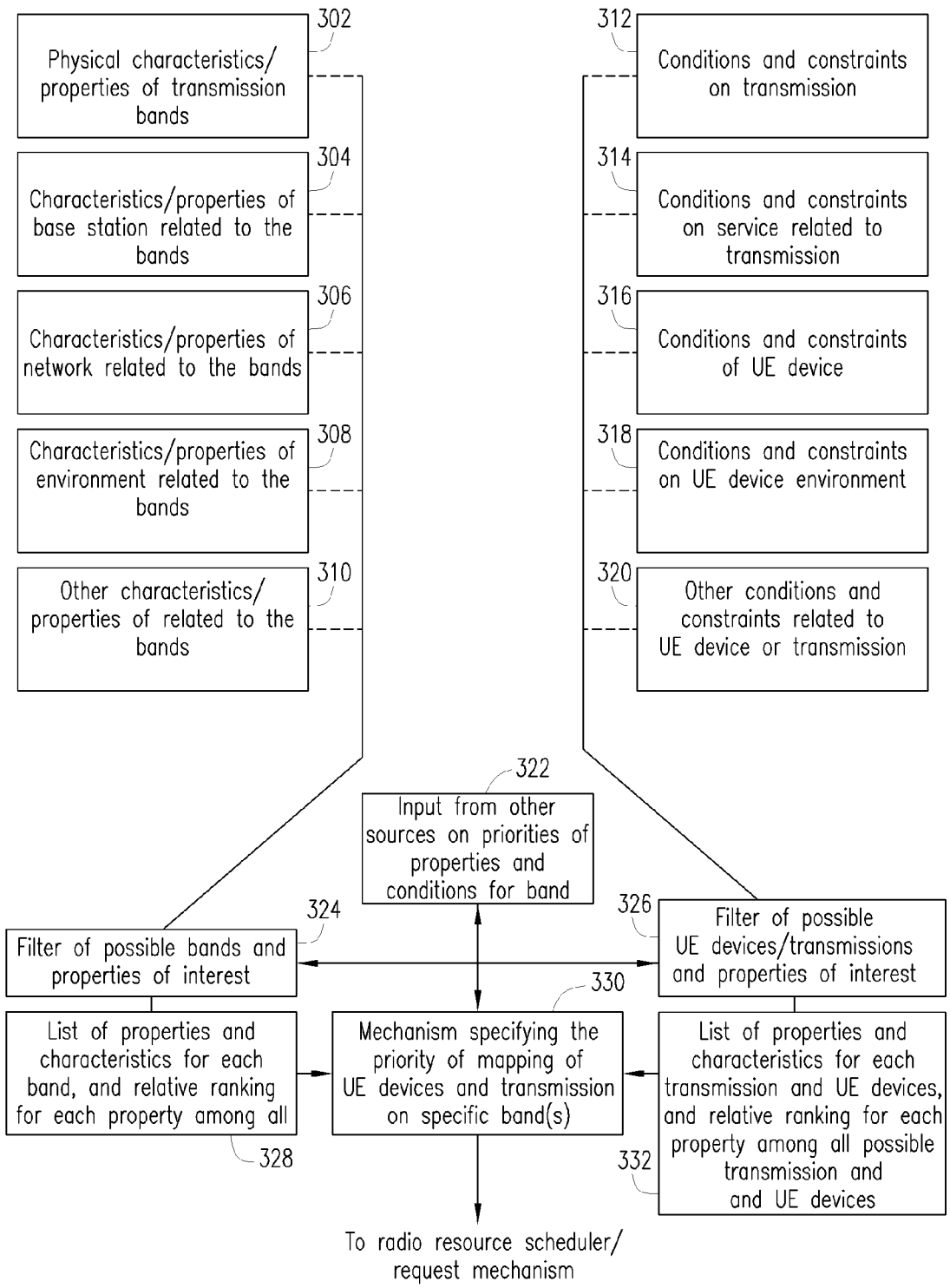
FIG. 3C is a diagram depicting inputs that can be used to determine an appropriate band to which to assign one or more UE devices according to an embodiment of the disclosure.

FIGS. 3A-3C are provided to illustrate various methods that may be used in the selection of a band for assignment to one or more UE devices according to embodiments of the application. With reference first to FIG. 3A, a method operable at a UE device is shown. A registration module of the UE device initially registers 301 on a communication network via a RAN that operates on multiple bands having different properties. A traffic condition module of the UE device determines 303 a value for a property associated with the mobile user device and a band condition module determines 305 a value for a corresponding property associated with each of the multiple bands. When the UE device needs to establish communication, the band selection module of the UE device determines 303 a specific band on the multiple bands on which to request assignment, based on the determinations of the traffic condition module and the band condition module. In the disclosed embodiment, the UE device takes an active part in determining a band on which to operate. In an alternate embodiment, the UE device provides information collected by at least one of the band condition module and the traffic condition module to the radio access network work to aid in selection of a band. Although the method is shown as reaching an end at this point, the UE device can continue to monitor the properties and request assignment to a different band if the conditions change.

With reference now to FIG. 3B, a method operable at a network node is shown according to an embodiment. In this embodiment, the network node determines 311 at least one property associated with the bands available through a given access point and also determines 313 at least one property associated with the traffic on those bands. In at least some embodiments, information regarding at least one property is received at the network node from one or more UE devices. In some embodiments, the collected information can be processed, as discussed in further detail below, to provide the information in a useful format. The network node determines 315 whether the current assignments should be modified. Modifications may be necessary or desirable when a new device enters the area and requests service, or when changes occur in a property of the bands or the associated traffic. If modifications are necessary or desirable, an appropriate band or bands are selected 317 for each UE device affected by the changes. The new selections are provided to modules in the network node that manage the assignment and scheduling of the bands. The network node can select an appropriate band for each UE device or may receive requests from the UE devices for specific assignments. Whether or not a change to the assignments was necessary, the method returns to determining 311 a property of the band and a property of the traffic, with any changes to the conditions and constraints of the bands and their traffic causing further changes to the dynamic assignments.

With reference now to FIG. 3C, the collection and use of information to assign bandwidth in an available band to a UE device is discussed in more detail. The process of determining an appropriate band for use by a UE device can be implemented at UE device 108 or at the network (e.g., at base station 106, base station controller 110, etc). Various properties related to transmission over a given band can be collected. These properties can include the physical characteristics and properties of the bands 302, the characteristics and properties of the base stations operating on the band 304, the characteristics and properties of the network operating on the band 306, the characteristics and properties of the environment in which the bands are operating 308 and any other characteristics and properties related to the bands 310. The conditions and constraints related to the UE device(s) and its traffic and environment can also be collected. These can include the conditions and constraints on transmission 312, the conditions and constraints on the services related to transmission 314, the conditions and constraints on the UE device 316, the conditions and constraints on the environment in which the UE devices operate 318 and other conditions and constraints related to the UE device or the transmissions in which the UE device takes part 320. In FIG. 3C, the various elements of information that are collected are joined to the rest of the figure by dotted lines to indicate that not all information streams may be complete, available, necessary or even desired. At a minimum, at least one parameter in some way related to the available bands, e.g. its frequency, or to transmission over the available bands, and at least one parameter related to a UE device, e.g. its identity, its traffic or environment should be gathered, or otherwise known or inferred, in order to map the UE device to an appropriate band later in the process.

Of the information collected, some portion of the information may be filtered prior to use in the assignment of a specific band to a respective UE device. For example, one or more of the properties of interest relating to the bands can be filtered 324 to produce a list of properties and characteristics for each band, with relative rankings for each of the properties on the list 328. Similarly, the properties of interest with regard to UE devices and their transmissions may be filtered 326 to produce a list of properties and characteristics for each transmission and UE device, with relative ranking for each of the properties 332. Filtering may include screening or extracting relevant information from the collected information or processing the information so that relevant portions are passed towards the scheduling mechanism. Filtering can include filtering of parameters over time to reduce fluctuations in decisions and to stabilize the control process. It can also include transformation or combination of information elements that result in a useful metric for input to the scheduling mechanism. The collected information regarding both the transmission bands and the UE devices and their related traffic, whether filtered or not, are provided as input to a mechanism that specifies the priorities of mapping UE devices' transmissions onto specific bands 330. The control of what information is relevant, and in general the operation of any filters, may be influenced by input from other sources, such as the network, the UE device(s) and outside elements 322, as well as by feedback from the scheduling mechanism decisions (not specifically shown). Information gathered can be inputted into the scheduling mechanism and processed accordingly by a set of one or more rules.

An example of a mechanism as illustrated in FIG. 3C is to schedule relatively "fast" moving UE devices in lower frequency bands and relatively "slow" UE devices in higher frequency bands. The information regarding the properties associated with the bands may indicate parameters including availability and frequencies of possible bands. The information regarding the properties associated with the UE device may indicate parameters including the UE device's relative speed. The scheduling mechanism may then map the assignment of the UE device to be scheduled to the appropriate band based on the mapping rule and information available. This information can be conveyed to the systems influencing radio resource management, which may include radio resource requests, assignments and scheduling depending on the configuration of the system.

The combination of various properties associated with the frequency bands with properties associated with the UE devices may lead to scheduling mechanisms that exploit or avoid certain combinations. The following exemplary embodiments are provided to give an idea of specific embodiments that may be used in scheduling UE devices on various bands. These embodiments are for illustration only and are not intended to be limiting.

In one embodiment, scattering in the bands and the distance between a terminal and the base station are a primary consideration when selecting a band for use by a UE device. Lower frequency bands, such as 700 MHz, undergo less scattering than bands at higher frequencies, such as 3.4 GHz. Accordingly, the lower frequency bands are preferred for long distance communication. A multi-band selector can be configured to select a lower frequency band for communication with UE devices that are more distant from the base station (i.e. tens of kilometers) and to select a higher frequency band for communication with UE devices that are closer to the base stations (i.e. tens of meters). In this way the communication system can more efficiently use its radio spectrum resources by minimizing interference among systems and permitting better frequency reuse among the various UE devices across the network and its coverage area.

In an alternate embodiment, the effects due to relative speed between the UE device and the base station are a primary consideration when selecting a band for use by a UE device. Lower frequency bands, e.g. 700 MHz, have a smaller Doppler change in frequency due to the relative speed of motion of a given UE device with regard to the base station. It can be advantageous to select a lower frequency band for communication with UE devices that are moving at generally higher speeds to reduce processing for frequency correction in the receivers. Conversely, it may be advantageous to select a higher frequency band, e.g. 3.4 GHz, for communication with UE devices that are moving at slower relative speeds as the processing for the required frequency correction would be small. There are also other reasons to select different bands for UE devices according to their relative speed, such as the complexity and rapidity of handovers, the nature of the traffic and the susceptibility to handovers. For example cell sizes are generally smaller at the higher frequency bands compared with the lower frequency bands. The UE device moving at high speed would thus preferably be assigned to the low frequency bands to reduce the frequency of handover between cells.

In a further alternate embodiment, the effects of fading are a primary consideration when selecting a band for use by a UE device. Lower-frequency bands, e.g. 700 MHz, experience fading for durations that are longer than those experienced at higher frequencies. Such fading is often due to the motion of the UE devices or of objects in the environment. Typically, a deep signal fade that may be of several milliseconds duration at 700 MHz would be less than a millisecond at 3.4 GHz. It can thus be advantageous to use modulation and coding schemes adapted to long duration fades and with tolerance for errors and retransmissions for UE devices operating in the lower bands. Likewise, the use of modulation and coding schemes adapted for short duration fades and with less need for retransmissions is advantageous for UE devices operating in higher bands. A radio access network may thus adapt its use of modulation and coding options according to the bands available and the required traffic performance.

In a further alternate embodiment, the types of communication services being provided are a primary consideration when selecting a band for use by a UE device. Some systems may offer different types of communication services between terminals and networks, including voice and data services. The voice services are distinguished by generally lower data rates, isochronous transmissions, low delay and good error tolerance while the data services are typically asynchronous, bursty transmissions with flexible delay tolerance and low error tolerance. It would be advantageous to select lower frequency bands for transmission of voice services and to select higher frequency bands for transmission of data services. When a UE device is utilizing voice and data services simultaneously, several bands may be active to provide multiple services to the terminal users. However, in order to minimize the power consumption in the UE device it is advantageous that the UE device operates on one band at a time. The scheduler should thus preferentially schedule activity in different radio bands at different times when services are spread across several bands. The bands and services would thus be time-multiplexed to conserve radio power resources and to minimize interference. Such scheduling across bands according to traffic type and radio resource constraints can improve user satisfaction including expected battery life.

In a further alternate embodiment, the effect of interference is a primary consideration when selecting a band for use by a UE device. In some communication systems, there may be times when there is more interference, either naturally occurring or as result of other communication systems' activity, in some bands compared to others. It is advantageous to select a band having the lower amount of interference for a UE device. The communication systems may thus assign bandwidth to a UE device in bands with low interference and low propensity to interference with other services. This method of assignment can minimize the interference to other traffic and also, due to the low level of interference, enables the radio access network to make use of advanced communication techniques such as high order modulation, low coding rates and multiple-inputs, multiple outputs (MIMO) transmissions. It may be advantageous for the RAN to organize its use of bands to dedicate a band for communication using such advanced communication techniques, and in particular UE devices using a MIMO rank, e.g. the number of transmission streams, higher than a specified rank or other differentiating MIMO mode. Such organization can improve the performance of these techniques.

In a further alternate embodiment, the capabilities of the UE device are a primary consideration when selecting a band for use by the UE device. The communication system may organize its selection of bands for UE devices such that devices of like capability are separated according to band. The UE devices capable of MIMO may be segregated into a band with low interference levels, for example. Broadcast signaling channels for the administration and operation of the RAN may also be assigned in bands preferred for their coverage and reliability, e.g. 700 MHz, while the signaling communication used for local administration or individual UE devices may be assigned to other bands that are suitable for the locations and capabilities of the individual UE device involved. The signaling and traffic communication may also be sent via different bands to accommodate local channel availability. The assignment of the various bands to various services, e.g., signaling and traffic, would be administered and signaled to the various UE devices through the use of the signaling capabilities and allocated channels that are inherent in the mobile communication system.

In a further alternate embodiment, frequency selectivity is a primary consideration when selecting a band for use by a UE device. In some communication systems, there may be at times more frequency selectivity within some bands compared to others. Frequency selectivity is caused by multi-path or other channel phenomenon such that different portions of an assigned radio resource within a band have different channel gains. Frequency selectivity can be advantageous in cases where frequency selective scheduling is used in a manner that selects a band for a UE device in the portion of the radio resources where it observes the best channel conditions. In other systems, frequency selectivity provides some diversity for wideband transmissions spanning a relatively wideband space of frequency within a band as the frequency diversity can mitigate effects of temporal fading of individual narrowband portions of the radio resource. In still other systems, in bands where the fading is relatively non-frequency selective, i.e. flat fading, it can be advantageous for systems to employ certain forms of beamforming, a signal processing technique used to control the directionality of the reception or transmission of a signal on a transducer array. It can also be advantageous to utilize channel estimation procedures in the frequency domain to increase the transmission capacity. Due to these and other relative benefits of frequency bands with different relative levels of frequency selectivity, it can be advantageous to select different bands for different UE devices to benefit the performance of the radio access network.

In a still further embodiment, the selection of a radio access technology and the associated properties is a primary consideration in selecting a band for use by UE devices. In this embodiment, the radio access technology selected for use in a given band or specific properties of the access technology can be adapted to better suit the conditions and constraints of the UE device or the associated traffic. As mentioned earlier, UE devices with higher relative speed may result in a higher frequency shift due to their rate of motion, i.e. the Doppler shift. In the uplink of a system that utilizes multi-carrier, multiple access technologies, e.g. OFDM, when several UE devices share a bandwidth and their respective Doppler frequency shifts are both different and significant with respect to the sub-carrier spacing, the reception of these uplink signals at the network may degrade. In these cases it is advantageous to adapt the radio access technology by, for example, using larger sub-carrier spacing, omitting some sub-carriers, i.e. use every second sub-carrier, or using a radio access technology with larger sub-carrier spacing for transmission involving higher speed UE devices to lessen the relative effect of the Doppler shift. As the suitability of a specific band for use by a UE device may in part depend on the ability to change either radio access technology or associated properties of the radio access technology, this ability to adapt access technologies is also a property to be considered in scheduling UE devices on various bands. This adaptation may also include, for example, an uplink channel that uses standard sub-carrier spacing for UE devices traveling at a slow speed relative to the base station and uses every-second-sub-carrier spacing for other mobiles that are traveling at higher speeds relative to the base station.

In a further embodiment, cost to either or both of the network and the UE device(s) is a primary consideration in selecting a band for use by the UE devices. In this embodiment, the assignment of bandwidth on a given band to a UE device is based on cost, which can be an important factor to both the network and the user. Costs on the network side may include service provider costs, operating cost, licensing, power, and backhaul cost. Likewise, cost on the UE device side may include cost of licensing, battery power, service provider agreements and roaming considerations. While it is advantageous for the network to schedule UE devices on bands based on its own cost constraints, it is advantageous in attracting and maintaining customers to also consider the cost structure of the UE device when operating on various bands. It should be noted that cost does not necessarily have to be the parameter prioritized for band mapping at both the network and the UE device. In some cases, cost may be considered as a condition on one side, e.g. the UE device, whereas another parameter, i.e. data rate, RAT or performance can be considered as a condition on the other side, e.g., the network.

Although these embodiments have been disclosed as separate systems, each using a single condition for primary consideration, a multi-band selector may consider any number or combination of these conditions when selecting bands for UE devices. When multiple conditions are utilized, the program may allow priorities to be associated with each condition and may allow these priorities to be managed by an administrator on the network side, a user on the UE device side, or both. For example, a weighting system may associate a given weight to be used to designate the importance of various conditions to the network or user. There may be a conflict between the most desirable selection according to the network's need and the most desirable selection according to need of the UE device or user. Any method of mediating between these conflicting needs may be incorporated into the embodiments as disclosed. A selection program may also develop sub-optimal solutions in situations where ideal options are not available or conflict with other constraints.

In one embodiment, the weighting and prioritization of possible conditions for a given UE device may be stored in a profile, and may further be dependent on the operator of the device. The profile may also indicate appropriate weighting and prioritization in response to inputs related to features of the band, the network, or both. The profile may be stored on the UE device itself or within a storage entity attached to the network.

The selection of an appropriate band for serving a UE device can occur dynamically or semi-statically, where semi-static selection is a sub-case of dynamic band selection in which the dynamic selection is based on longer-term phenomenon. In the semi-static case, the selection of a specific band or bands for a UE device is based on the properties associated with the band(s) and the properties associated with the UE device. In at least one embodiment, the selection occurs on initial entry into the system, with the UE device and RAN exchanging information regarding various parameters that affect transmission. Once set, the band selected for the UE device may be changed by factors that include a change in band properties, a change in UE device constraints and conditions, motion of the UE device relative to the serving base station, traffic changes, interference or other change that impact one or more aspects of the band properties, the radio access network, or the UE device.

The selection of a frequency band for a UE device may also occur in a dynamic fashion. The multi-band selector may consider factors including short-term traffic considerations, data transmission type, interference conditions, and so on. Dynamic selection of a different frequency band for a UE device may also occur due to failures or changes in available information without necessarily changing the actual properties associated with the band or properties associated with the UE device. For example, if a channel metric such as the channel quality indicator or precoder index becomes unavailable for some time, it may become less advantageous to continue with a particular type of communication scheme that depends on that channel metric information, e.g., MIMO transmissions. If a band is currently used for MIMO type transmissions, it may benefit the system performance to select a different band that is suited to a communication method that can still be supported for the device.

Band selection for scheduling UE devices on appropriate radio bands may be made by either the UE device or the network, depending on the configuration. In addition, the UE device and a network node can exchange information that may be used by either entity. For example, the UE device may provide information that the UE device has collected to the network and may in turn receive information that the network has collected. The UE device may request a specific band from the network or negotiate with the network node to determine a best fit for the needs of the UE device and the network. It may also be advantageous to schedule a UE device on multiple bands based on factors that may include the type of service. For example, concurrent voice and data traffic may be scheduled on separate bands for a single UE device. Typically such "concurrent" scheduling would be accomplished by interleaving transmissions in separate bands to conserve radio resources and battery life in the UE device. Network signaling and broadcast services may also be scheduled in different bands than the voice or data traffic.

In order to provide support for multi-band operation, several modules can be added to the apparatus of a conventional communication system or included in the design of future systems. A first module is configured to determine an appropriate band for one or more UE devices and to provide the determined information to the appropriate elements of the network; this module is generally know as a multi-band selector. The multi-band selector can receive input from two other modules: a module configured to determine the properties associated with the radio bands, i.e. a band condition module, and a module configured to analyze the properties associated with the UE devices, i.e. a traffic condition module. These modules can be implemented in the form of computer codes stored within either or both of the network and the UE devices and can be provided as a computer program on a computer-readable medium that can be loaded into a network node or a UE device. It will be understood that in other embodiments, these modules are implemented in hardware, firmware or in any combination of hardware, software and firmware. When implemented in a UE device, these modules would have a primary function of determining an appropriate band or bands for operation of the individual UE device, but can also provide information that the device has collected to the network node. When implemented in a network node, these modules are used to direct the assignment of multiple UE devices to appropriate bands, but can likewise share information with UE devices in an interactive manner and can receive recommendations and requests from the UE devices.

The band condition module can make use of information derived from previous transmissions in the relevant bands or can use basic information from models for the relevant bands, i.e. from literature papers or band modeling. Some of this information may be static in the form of general propagation models for each band, and some of the information may be reported by the transceiver based on measurements of the band operations. In at least one embodiment, the band condition module uses channel models supplemented with measurements made in the local system, with local measurements used to derive the appropriate parameters for the channel model.

The traffic condition module collects and stores information related to the traffic between one or more base stations and one or more UE devices under the supervision of the base station(s), as well as analyzing the communication traffic so that the appropriate bands can be selected for UE devices. The traffic condition module can make use of information from the signaling channels of the communication network to derive traffic information and can provide control messages and commands to the radio apparatus to aid in selection of the desired bands and radio operating parameters, e.g. power level, channel, modulation, coding, timing, etc. For those UE devices that are in motion, the traffic condition module can measure the speed of motion by a change in GPS position, a rate of channel change, Doppler shift, feedback from base stations, or other methods. In other cases, the Doppler shift can be derived from the measured speed of motion.

Figure 4:
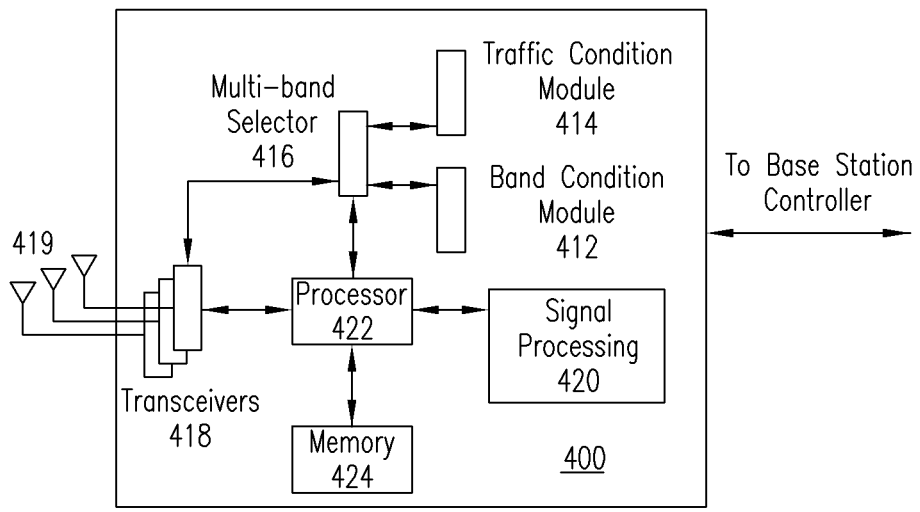
FIG. 4 is a functional block diagram of a base station operable to assign radio resources on multiple bands according to an embodiment of the disclosure.
Figure 5:
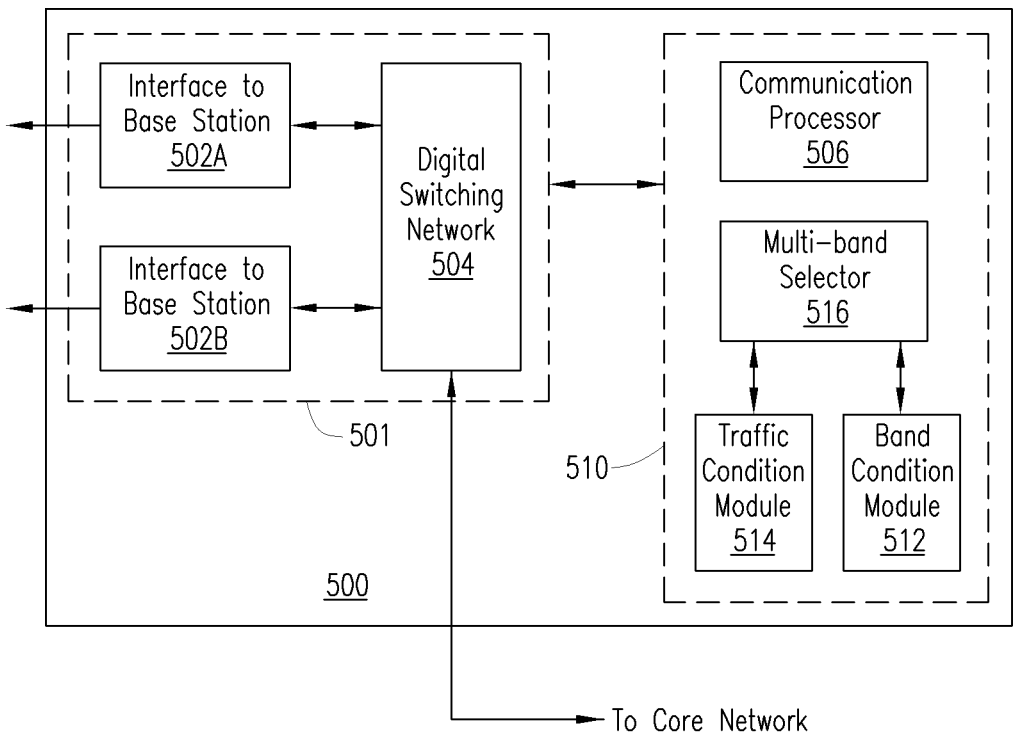
FIG. 5 is a functional block diagram of a base station controller operable to assign radio resources on multiple bands according to an embodiment of the disclosure.
Figure 6:
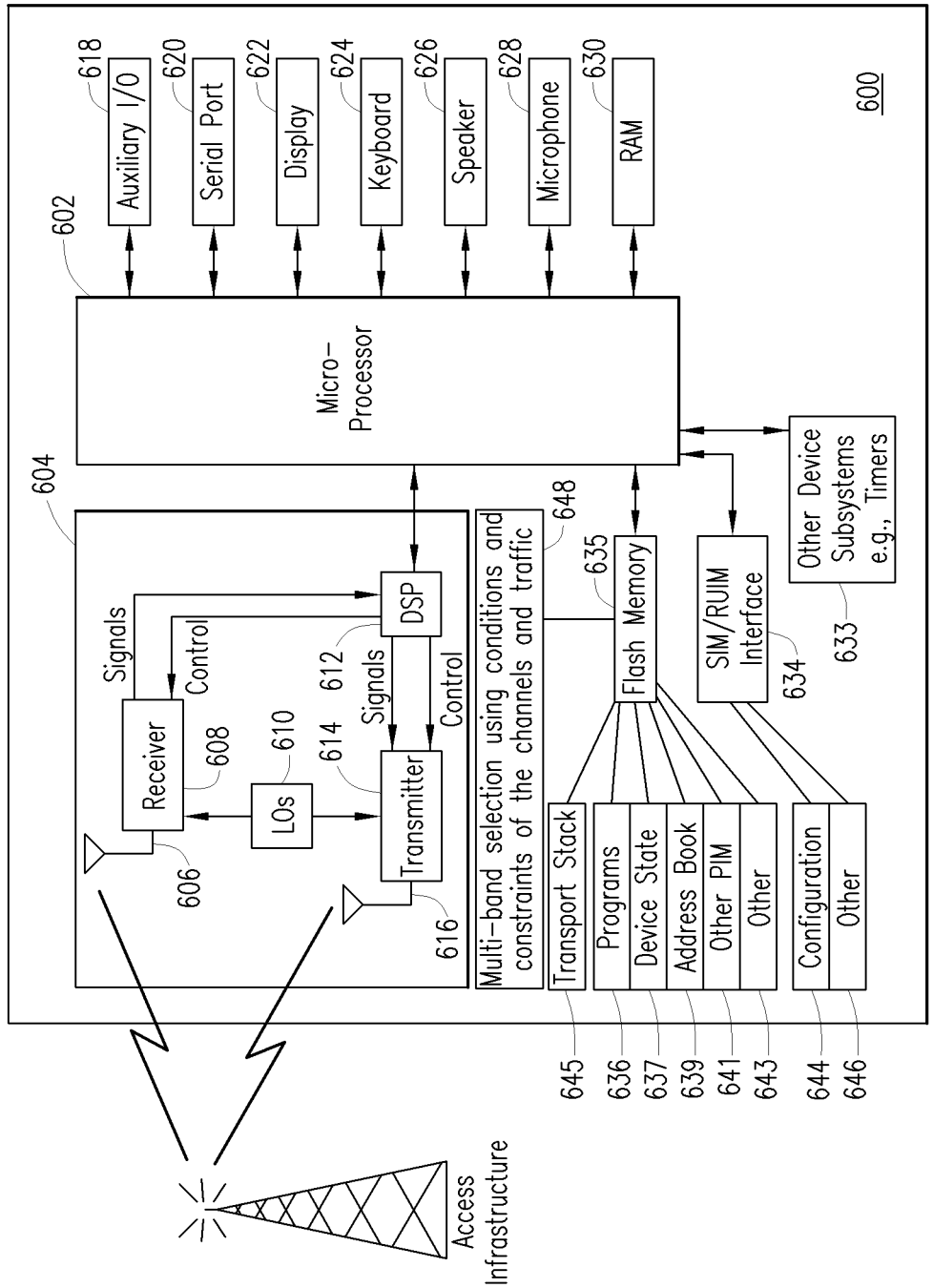
FIG. 6 is a functional block diagram of a UE device according to an embodiment of the disclosure.

Both the band condition module and the traffic condition module make their respective information available to the multi-band selector to facilitate the selection of an appropriate radio band for each UE device present within the coverage area of base station(s) served by the multi-band selector modules. Depending on whether a specific embodiment of the multi-band selector module is part of the network or the UE device, the module uses the traffic condition information for each UE device and the multi-band condition module to select a band for operation of one or more UE devices. The selection is provided to the radio transceivers at both the base station and the individual UE device for operation in the selected band and channel. FIGS. 4-6 provide example embodiments of these modules in a base station, a base station controller and a UE device.

With reference first to FIG. 4, a functional block diagram is shown of an embodiment of base station 400, which is operable to perform dynamic band scheduling in a radio access network, e.g. base station 106 in FIG. 1. Base station 400 comprises multiple radio transceivers 418, each connected to an antenna 419, and also maintains a connection to a base station controller (not specifically shown). In one embodiment, each transceiver is operable within a single band, with different transceivers operating in a different one of the provided bands. In at least one embodiment, each transceiver is operable on multiple bands and can be configured as necessary to handle the needs of the current traffic. In at least some embodiments, each transceiver is operable to change the radio access technology used or to adjust the properties of the radio access technology as necessary. A processor 422 is coupled to a memory 424 and interacts with transceivers 418, multi-band selector 416, and signal processing module 420. Multi-band selector module 416 is in communication with each of transceivers 418 and with traffic condition module 414 and channel condition module 412. Together, modules 412, 414, 416 are operable to guide the assignment of bandwidth in appropriate bands to the UE devices in communication with base station 400.

In the embodiment shown in FIG. 5, a functional block diagram is shown of an embodiment of Base station controller 500, which is operable to perform dynamic band scheduling in a radio access network, e.g. BSC 110 in FIG. 1. BSC 500 contains base station interface modules 502A, 502B, which connect through digital switching network 504 to the core network and associated service networks. Although only two base station interface modules 502 are shown, it will be understood that base station controller 500 may control tens of base stations or more, with each base station having a separate interface 502 to base station controller 500. Base-station interface modules 502 and digital switching network 504 together form switching system 501 for BSC 500. BSC 500 also contains a control section 510, which contains communication processor 506 coupled to a memory (not specifically shown) and the modules for selecting an appropriate band for assignment to a UE device, e.g., multi-band selector module 516, traffic condition module 514 and band condition module 512. Modules 512, 514, 516 are operable to guide the assignment of bandwidth in appropriate bands to the UE devices that are in communication with any of the base stations controlled by BSC 500. Modules 512, 514, 516 are also operable to share any collected information with UE devices operating on the associated base stations in order to enable smooth operation between all elements of the communication system.

FIG. 6 depicts a block diagram of an embodiment of a communication device 600 operable as an UE device, e.g., UE device 108, for purposes of the present patent disclosure. A microprocessor 602 providing for the overall control of an embodiment of the UE device is operably coupled to a communication subsystem 604 that is capable of operation on multiple bands and in multiple access technologies as necessary. The communication subsystem 604 generally includes one or more receivers 608 and one or more transmitters 614 as well as associated components such as one or more local oscillator (LO) modules 610 and a processing module such as a digital signal processor (DSP) 612. As will be apparent to those skilled in the field of communication, the particular design of communication module 604 may be dependent upon the bands and access technologies with which the mobile device is intended to operate (e.g., CDMA, GSM, WLAN, LTE-A, et cetera). Regardless of the particular design, however, signals received by antenna 606 through appropriate access infrastructure are provided to receiver 608, which may perform such common receiver functions as signal amplification, frequency down conversion, filtering, channel selection, analog-to-digital (A/D) conversion, and the like. Similarly, signals to be transmitted are processed, including modulation and encoding, for example, by DSP 612, and provided to transmitter 614 for digital-to-analog (D/A) conversion, frequency up conversion, filtering, amplification and transmission over the air-radio interface via antenna 616. In at least one embodiment, communication module 604 may be duplicated so that mobile communication device 600 is able to operate on several bands simultaneously and may have the capability to operate using multiple-inputs, multiple-outputs (MIMO). In some implementations of the communication modules (604), the receive antenna (606) and the transmit antenna (616) may be combined into a single apparatus and appropriately coupled to the receiver (608) and the transmitter (614). Some implementations may also include multiple antenna for improved performance using techniques such as diversity.

Microprocessor 602 may also interface with further device subsystems such as auxiliary input/output (I/O) 618, serial port 620, display 622, keyboard/keypad 624, speaker 626, microphone 628, random access memory (RAM) 630 and any other device subsystems, e.g., timer mechanisms, generally labeled as reference numeral 633. To control access, an interface 634 may also be provided in communication with the microprocessor 602 with respect to a removable storage module (Universal/Subscriber Identity Module (U/SIM) or Removable User Identity Module (RUIM)). In one implementation, U/SIM or RUIM interface 634 may be operable with a U/SIM or RUIM card having a number of key configurations 644 and other information 646 such as default content disposition profiles, policy managers, alternative network information, as well as identification and subscriber-related data that may supplement local storage-based information.

Operating system software and applicable service logic software may be embodied in a persistent storage module (i.e., non-volatile storage) such as Flash memory 635. In one implementation, Flash memory 635 may be segregated into different areas, e.g., storage area for computer programs 636 (e.g., service processing logic), as well as data storage regions such as device state 637, address book 639, other personal information manager (PIM) data 641, and other data storage areas generally labeled as reference numeral 643. In addition, a module for multi-band selection using conditions and constraints of the channels and traffic 648 is provided for facilitating one or more embodiments as set forth in detail hereinabove. Module 648 is shown as a single module in this embodiment, although the functions of a band condition module, a traffic condition module and a multi-band selector are included in this module. In at least one embodiment, multi-band selection module 648 includes a radio resource and request mechanism that negotiates with a network node for assignment to a band for communication. In at least one embodiment, a separate radio resource and request module (not specifically shown) receives the input from multi-band selection module 648. In some situations, module 648 may only provide information that the UE device has stored or collected to the network for use in selection of a band, while in other situations module 648 may have a priority in selection of a band that the radio access network would only override in specific instances, such as when the network is unable to accommodate the UE device on the requested band due to traffic or other concerns. Selection of a band may also be shared between module 648 and a corresponding module or modules in the radio access network.

It will be recognized by those skilled in the art upon reference hereto that although embodiments of this disclosure may comprise an arrangement similar to the base station of FIG. 4, the BSC of FIG. 5 or the UE device shown in FIG. 6, there can be a number of variations and modifications, in hardware, software or firmware, with respect to the various modules depicted. Accordingly, the arrangements shown in these figures should be taken as illustrative rather than limiting with respect to the embodiments of the present patent disclosure. Various modifications and combinations of the illustrative embodiments as well as other embodiments, will be apparent to persons skilled in the art upon reference to the description. It is, therefore, intended that the appended claims encompass any such modifications or embodiments.

The invention claimed is:

1. A node in a radio access network that operates in a plurality of bands having different properties, the network node comprising:
    a band-condition module that determines a value of a property associated with the plurality of bands;
    a traffic condition module that determines a value of a corresponding property associated with a user equipment device requesting bandwidth from the radio access network; and
    a multi-band selector module that assigns the user equipment device to a first band based at least in part on the determinations made by the band-condition module and the traffic-condition module, wherein responsive to a change in the property associated with the user equipment device the multi-band selector module assigns the user equipment device to a second band and further wherein the multi-band selector module is configured to assign the user equipment device to a higher frequency band when the user equipment device is closer to the base station and to assign the user equipment device to a lower frequency band when the user equipment device is farther from the base station.

2. The node of claim 1 wherein the node receives information from the user equipment device that is used to determine the first band.

3. The node of claim 1 wherein the property associated with the plurality of bands is one of short term fading, scattering, frequency selectivity, propagation losses, penetration losses, Doppler shift, atmospheric and environmental absorption, propagation, long-term fading, performance of transmission and reception equipment, interference conditions, differences in regulation, differences in radio access technology applied, ability to change radio access technology, differences in radio access technology configuration cost, differences in factors impacting delay and bandwidth.

4. The node of claim 1 wherein the property associated with the user equipment devices comprises one of type of service requested, speed of motion of the user equipment device relative to a base station with which the user equipment device is communicating, proximity of the user equipment device to the base station, band quality, capabilities of the user equipment device, sensitivity to delay of a connection being sought, and traffic volume.

5. The node of claim 1 wherein the node is one of a base station and a base station controller.

6. The node of claim 1 wherein the radio access network comprises an aggregation of bands that utilize different radio access technologies.

7. The network node of claim 1 wherein the radio access network is operable in Long Term Evolution Advanced radio access technology.

8. A node in a radio access network that operates in a plurality of bands having different properties, the network node comprising:
    a band-condition module that determines a value of a property associated with the plurality of bands;
    a traffic condition module that determines a value of a corresponding property associated with a user equipment device requesting bandwidth from the radio access network; and
    a multi-band selector module that assigns the user equipment device to a first band based at least in part on the determinations made by the band-condition module and the traffic-condition module, wherein responsive to a change in the property associated with the user equipment device the multi-band selector module assigns the user equipment device to a second band and further wherein the multi-band selector module is configured to assign the user equipment device to a frequency band having low interference if the user equipment device uses advanced communication techniques such as high order modulation, low coding rates and multiple-inputs, multiple outputs.

9. The node of claim 8 wherein the multi-band selector is configured to assign user equipment devices having similar capabilities in the same band.

10. The node of claim 8 wherein the multi-band selector is configured to change or modify a radio access technology used in a given band.

11. The node of claim 10 wherein the multi-band selector is configured to select one of a change to the sub-carrier spacing and omitting some sub-carriers in an orthogonal frequency division multiplexing access technology.

12. The node of claim 11 wherein the omission of sub-carriers is non-uniform to protect sub-carriers used for pilot signaling.

13. The node of claim 11 wherein the sub-carriers are non-uniformly omitted according to the Doppler shift of the traffic sub-carrier group.

14. A method operable in a node of a radio access network that operates in a plurality of bands having different properties, the method comprising:
    determining a value of a property associated with the plurality of bands;
    determining a value of a property associated with a user equipment device requesting bandwidth from the radio access network; and
    assigning the user equipment device to a first band based at least in part on the determinations;
    wherein when the property associated with the user equipment device changes the multi-band selector module can assign the user equipment device to a second band and further wherein the method assigns the user equipment device to a higher frequency band when the user equipment device is closer to a respective base station and assigns the user equipment device to a lower frequency band when the user equipment device is farther from the respective base station.

15. The method of claim 14 wherein the property associated with the plurality of bands is one of short term fading, scattering, frequency selectivity, propagation losses, penetration losses, Doppler shift, atmospheric and environmental absorption, propagation, long-term fading, performance of transmission and reception equipment, interference conditions, differences in regulation, differences in radio access technology applied, ability to change radio access technology, differences in radio access technology configuration cost, differences in factors impacting delay and bandwidth.

16. The method of claim 14 wherein the property associated with the user equipment devices comprises one of type of service requested, speed of motion of the user equipment device relative to a base station with which the user equipment device is communicating, proximity of the user equipment device to the base station, band quality, capabilities of the user equipment device, sensitivity to delay of a connection being sought, and traffic volume.

17. The method of claim 14 further comprising receiving information from the user equipment device that is used to determine the first band.

18. The method of claim 14 wherein the method assigns the user equipment device to a band having low interference if the user equipment device uses advanced communication techniques such as high order modulation, low coding rates and multiple-inputs, multiple outputs.

19. The method of claim 14 wherein the method assigns user equipment devices to a same band when the user equipment devices have similar capabilities.

20. The method of claim 14 wherein the method changes or modifies a radio access technology used in the first band.

21. The method of claim 20 wherein the method is configured to select one of a change to the sub-carrier spacing and omitting some sub-carriers in an orthogonal frequency division multiplexing access technology.

22. The method of claim 21 wherein the omission of sub-carriers is non-uniform to protect sub-carriers used for pilot signaling.

23. The method of claim 21 wherein sub-carriers are non-uniformly omitted according to the Doppler shift of the traffic sub-carrier group.

* * * * *